United States Patent [19]

Thomas

[11] Patent Number: 4,509,706
[45] Date of Patent: Apr. 9, 1985

[54] SAFETY BELT SYSTEM WITH TENSION ELIMINATING MECHANISM

[75] Inventor: Rudy V. Thomas, Sterling Heights, Mich.

[73] Assignee: Allied Corporation

[21] Appl. No.: 493,195

[22] Filed: May 10, 1983

[51] Int. Cl.³ ..................... A62B 35/02; B65H 75/48
[52] U.S. Cl. ........................... 242/107.4 A; 242/107.7
[58] Field of Search ................ 242/107.7, 107.4 A, 242/107.4 B, 107.4 D; 280/806, 807; 297/475–480

[56] References Cited

U.S. PATENT DOCUMENTS

| 3,348,789 | 10/1967 | Hirsch | 242/107.4 D |
|---|---|---|---|
| 3,635,420 | 1/1972 | Romanzi, Jr. | 242/107.4 D |
| 3,834,646 | 9/1974 | Heath | 242/107.7 |
| 3,869,098 | 3/1975 | Sprecher | 242/107.4 A |
| 3,873,041 | 3/1975 | Rumpf et al. | 242/107.4 A |
| 3,973,786 | 8/1976 | Rogers Jr. | |
| 4,023,746 | 5/1977 | Magyar | 242/107.7 |
| 4,065,072 | 12/1977 | Magyar | 242/107.7 |
| 4,066,223 | 1/1978 | Takada | 242/107.7 X |
| 4,153,274 | 5/1979 | Rogers, Jr. et al. | 242/107.7 X |
| 4,417,702 | 11/1983 | Fohl | 242/107.4 A X |

Primary Examiner—John M. Jillions
Attorney, Agent, or Firm—James R. Ignatowski; Russel C. Wells

[57] ABSTRACT

A safety belt system having separate lap and shoulder belts. The belts are attached to a double spool belt retraction mechanism which is spring biased to retract the belts. Each spool has associated with it a ratchet wheel and a pawl movable into engagement with the ratchet wheel to prevent extension of the associated belt under certain conditions. A pendulum type inertial member is associated with each pawl and is operable under certain conditions of vehicle acceleration and attitude to move the associated pawl into engagement with the related ratchet wheel. The system includes a belt tension eliminating mechanism which prevents retraction of the shoulder belt under certain operating conditions and a member associated with each pawl which prevents the pawl from rattling under certain operating conditions.

9 Claims, 11 Drawing Figures

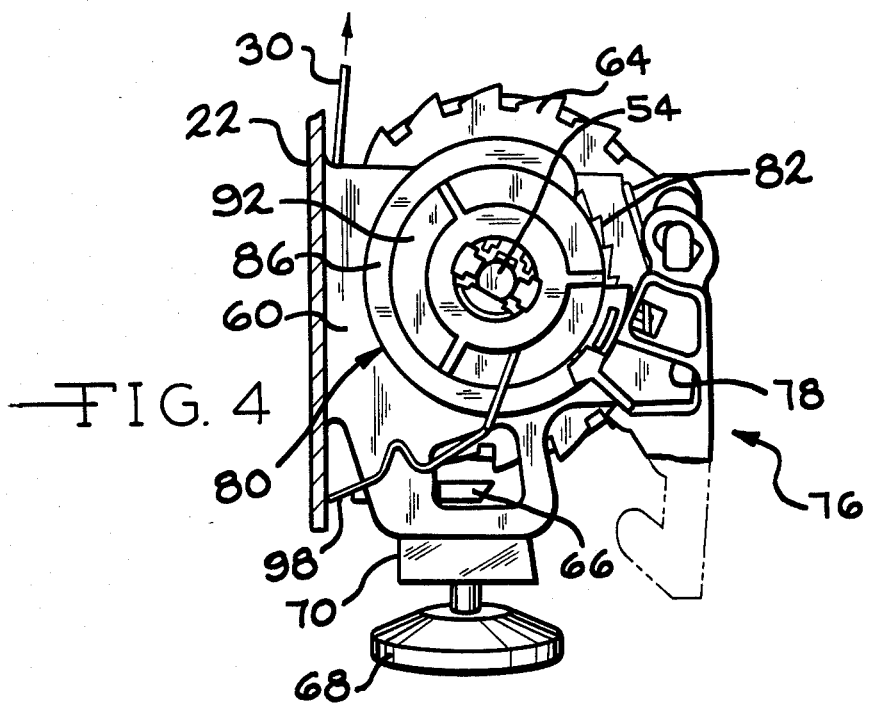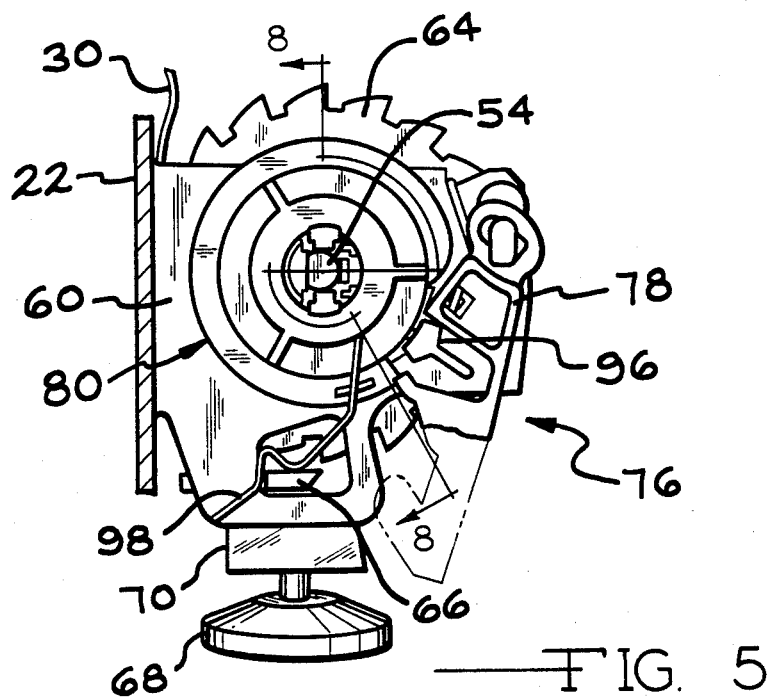

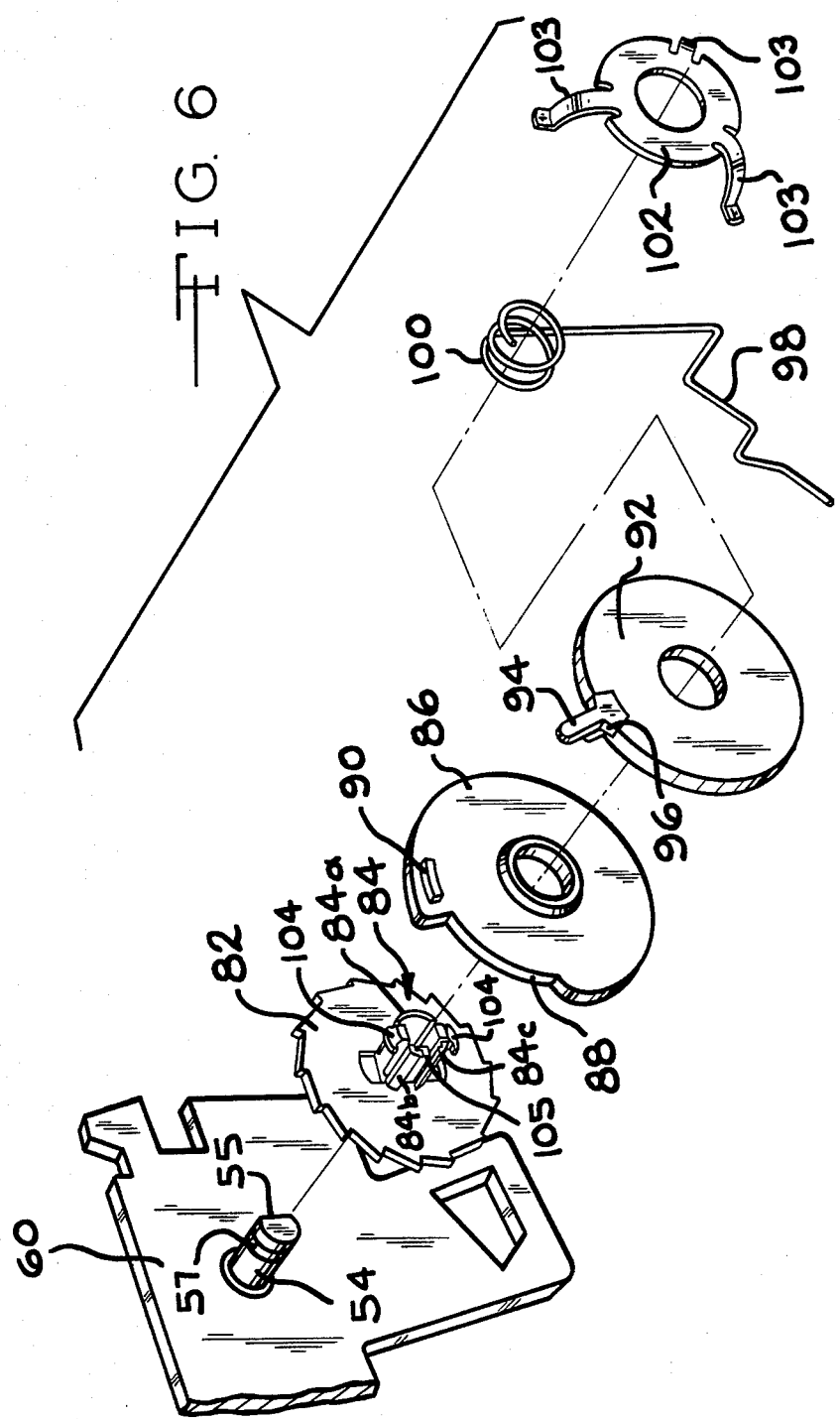

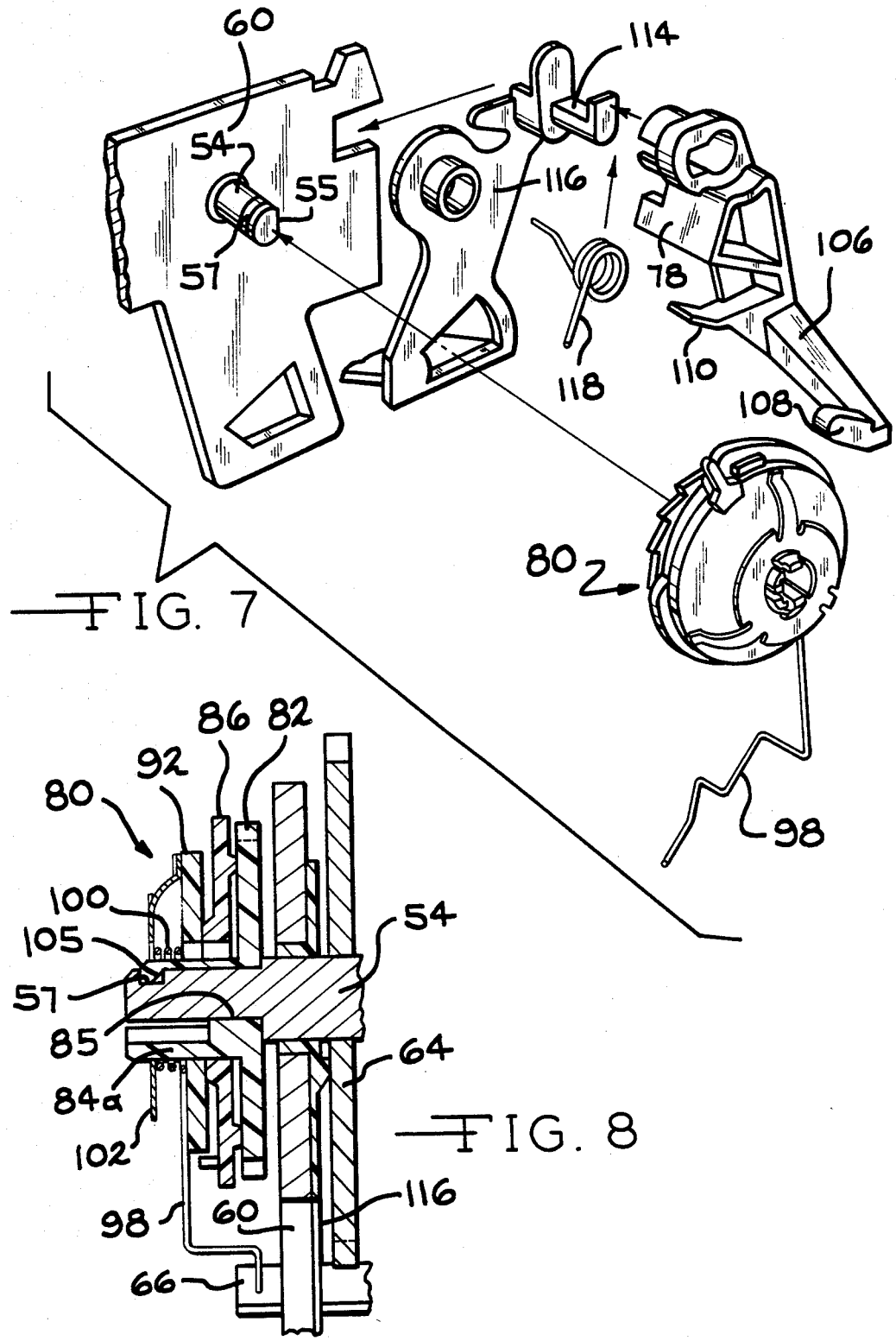

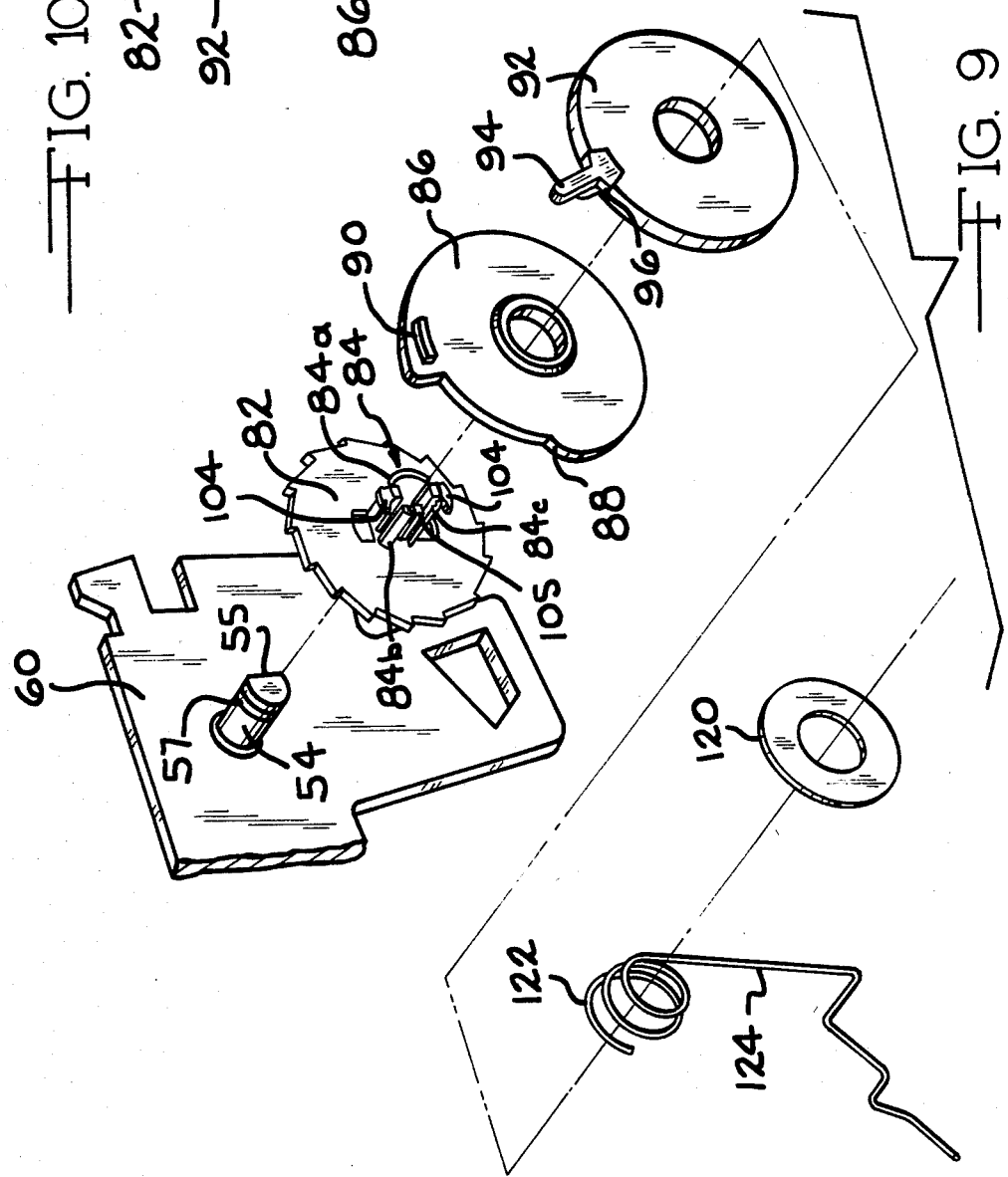

SAFETY BELT SYSTEM WITH TENSION ELIMINATING MECHANISM

BACKGROUND OF THE INVENTION

This invention relates generally to a vehicle occupant restraint system and more particularly to a tension eliminating mechanism for a belt retractor.

Occupant restraint systems for motor vehicles commonly employ a shoulder belt which extends over the shoulder and across the chest of the seated occupant. Shoulder belts are found in so called three point belt systems which utilize a single length of belt and in two belt systems which has a shoulder bit and a separate lap belt. In both systems the shoulder belt is arranged to be anchored by a buckle mounted inboard of the occupant seating position and anchored at the other end to the vehicle by means of a belt retractor. The belt retractor utilized in such systems commonly utilizes a relatively strong windup spring which rotates a spool to wind a substantial portion of the shoulder belt onto the spool.

Utilization of a relatively strong windup spring in the retractor results in a level of shoulder belt load across the chest which is annoying to some seat occupants, so much so that some occupants may even elect not to utilize the seat belt system. Consequently, it is desirable to provide some means for eliminating the tension of the windup spring on the belt so as to reduce or eliminate the tension of the shoulder belt across the chest of the occupant.

It is known to provide a belt retractor with a winding prevention mechanism for the purpose of reducing or eliminating the tension of the shoulder belt across the chest of the occupant, and such systems are shown in U.S. Pat. No. 4,065,072 issued in the name of Joseph J. Magyar on Dec. 27, 1977, U.S. Pat. No. 3,973,786 issued in the name of Lloyd W. Rogers, Jr., on August 1976 and U.S. Pat. No. 3,869,098 issued in the name of Raymond G. Sprecher on Mar. 4, 1975. However, one of the disadvantages of the prior known tension eliminating mechanisms is that they are relatively costly.

BRIEF SUMMARY OF THE INVENTION

The invention provides a safety belt system having separate lap and shoulder belts that are attached to a double spool belt retraction mechanism which is spring biased to retract the belts. Each spool has associated with it a ratchet wheel and a pawl movable into engagement with the ratchet wheel to prevent extension of the associated belt under certain operating conditions. A pendulum type inertial member is associated with each pawl and is operable under certain conditions of vehicle acceleration and attitude to move the associated pawl into engagement with the adjacent ratchet wheel.

According to the preferred embodiment of the invention, the safety belt system includes a belt tension eliminating mechanism which prevents retraction of the shoulder belt under certain operating conditions. The mechanism includes a subassembly and a pawl. The subassembly includes a ratchet wheel with a hollow shaft on which are rotatably journaled a pair of members which serve to block engagement of the pawl with the ratchet wheel, a spring for biasing the blocking members and ratchet wheel into frictional engagement and means for retaining the spring and the blocking members on the hollow shaft.

Also, there is provided a member associated with each belt extension preventing pawl which prevents the pawl from rattling under certain operating conditions.

It is a principal object of this invention to provide an improved tension eliminating mechanism which is less expensive to manufacture then similar currently available mechanisms.

The above and other objects, features and advantages of my invention will become apparent upon consideration of the specification and the appended drawing.

BRIEF DESCRIPTION OF THE DRAWING

FIG. 4 is a view similar to FIG. 3, but showing the spool rotated somewhat in the belt extending direction;

FIG. 5 is a view similar to FIG. 3, but with the belt tension eliminating mechanism engaged;

FIG. 6 is an exploded view of the belt tension eliminating subassembly shown in FIG. 1;

FIG. 7 is a partially exploded view of the belt tension eliminating mechanism and subassembly;

FIG. 8 is a cross section of the belt tension eliminating subassembly taken along line 8—8 of FIG. 5;

FIG. 9 is an exploded view of a modification of the belt tension eliminating subassembly;

FIG. 10 is a perspective view of the modified subassembly of FIG. 9, and

FIG. 11 is a view of a combined retainer ring, spring and blocking member which could be substituted for corresponding separate components to the subassembly shown in FIGS. 6 and 9.

DETAILED DESCRIPTION OF THE PREFERRED EMBODIMENT

Figure 1:
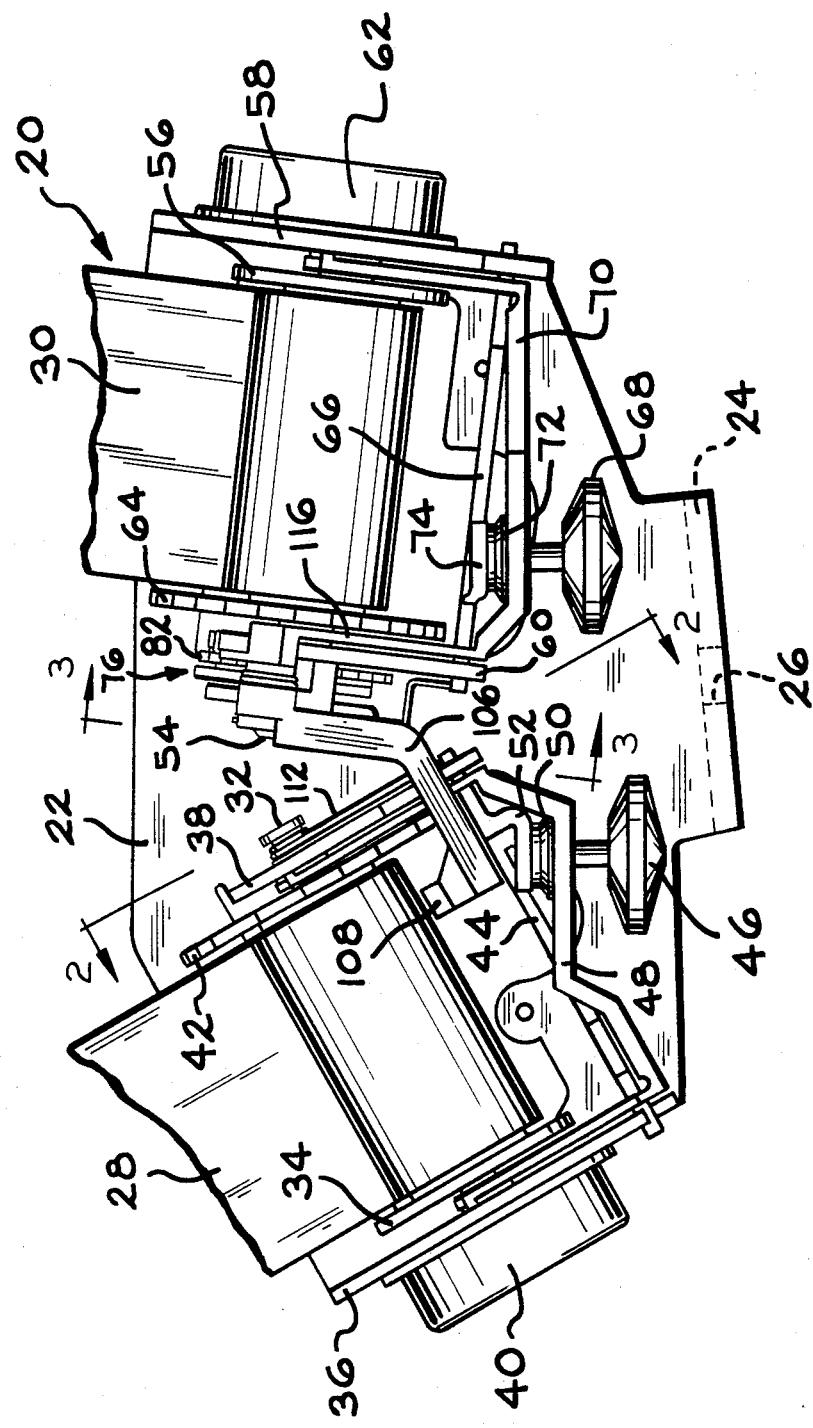
FIG. 1 is a front elevational view of a safety belt system having a double spool belt retraction mechanism and a belt tension eliminating mechanism.
Figure 2:
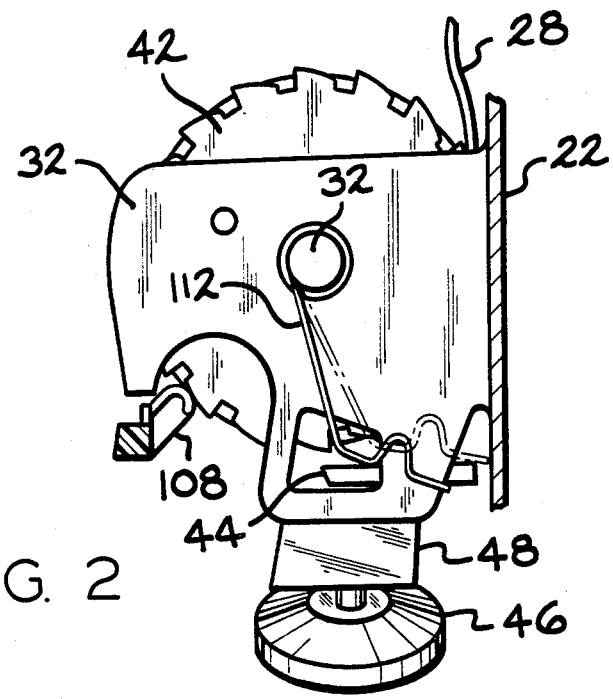
FIG. 2 is a view taken along line 2—2 of FIG. 1 showing one end of the lap belt spool retraction mechanism in the fully retracted condition.
Figure 3:
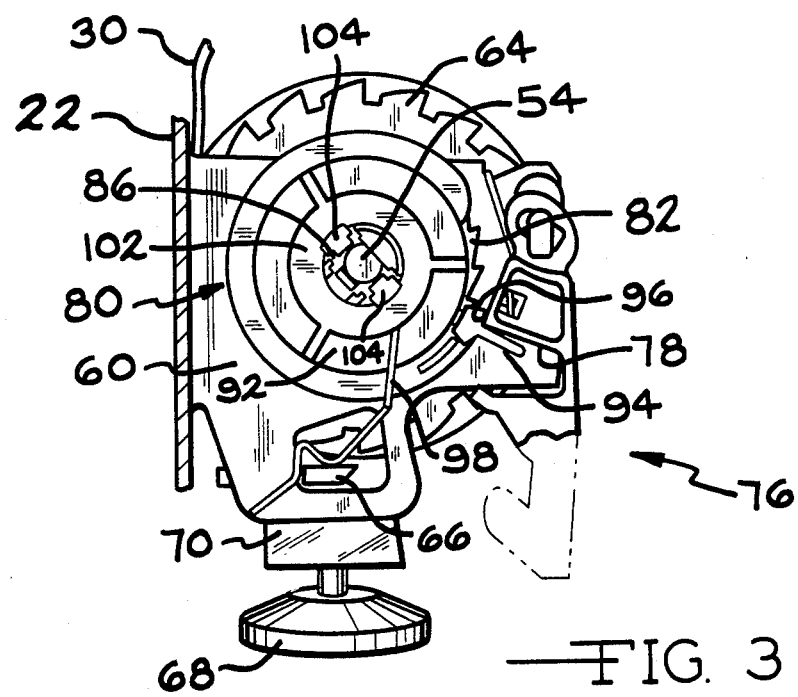
FIG. 3 is a view taken along line 3—3 of FIG. 1 showing one end of the shoulder belt spool retraction mechanism in the fully retracted condition.

Referring to FIGS. 1, 2 and 3, the reference numeral 20 denotes a double spool retraction mechanism which forms part of a safety belt system that serves to restrain an occupant in a vehicle. Retraction mechanism 20 includes a main support plate 22 which is adapted to be anchored to a vehicle by means of a bracket 24 which includes a opening 26 for a bolt or screw (not shown).

Retraction mechanism 20 includes a lap belt 28 which is intended to pass across the lap of the occupant and a shoulder belt 30 which is intended to extend over the shoulder and diagonally across the chest of the occupant. It will be understood that although only portions of both belts 28 and 30 are shown that the remote ends of both belts are connected preferably to a common buckle tongue which can be anchored to the vehicle.

Belt 28 is connected to and wound around the shaft 32 of a spool 34 which is journaled for rotation between a pair of brackets 36 and 38 that extend outwardly from support plate 22. A rewind spring (not shown) is connected to one end of shaft 32 and anchored within a spring housing 40 mounted on bracket 36 to bias spool 34 in the direction to retract or wind belt 28 onto spool 34.

Extension of lap belt 28 under certain conditions of vehicle acceleration and attitude is prevented by means of a ratchet wheel 42 fixed to spool 34 and a pawl 44 movable into engagement with the teeth of ratchet wheel 42. Movement of pawl 44 is caused by action of a pendulum type inertial member 46 suspended for omnidirectional movement through an opening in a support 48 which extends between brackets 36 and 38. The top of inertial member 46 forms a cam 50 which engages a cam follower 52 that is integral with pawl 44 so that when inertial member 46 is moved in any direction away from the vertical position, as shown in FIG. 1, pawl 44 is caused to be moved into engagement with the teeth of ratchet wheel 42.

An anti-rattle member or wire 112 is carried by shaft 32 by means of a coiled portion which loosely encircles shaft 32 so that rotation of shaft 32 brings member 112 into engagement with pawl 44 as seen in FIG. 2. Rotation of shaft 32 in the other direction swings member 112 away from engagement with pawl 44. The engagement of member 112 with shaft 32 is such that member 112 tends to rotate with shaft 32, but permits rotation of shaft 32 relative to member 112 when member 112 is blocked from movement.

Shoulder belt 30 is attached to and wound around the shaft 54 of a spool 56 which is rotatably journaled between a pair of brackets 58 and 60. Spool 56 is biased to rotate in the direction to retract or wind belt 30 onto spool 56 by means of a rewind spring (not shown) connected to one end of shaft 54 and anchored at its other end within spring housing 62 which is fixed to bracket 58. As best seen in FIG. 7, it will be noted that shaft 54 includes a flat 55 and a groove 57, the purposes of which will become apparent soon. Extension of shoulder belt 30 from spool 56 under certain conditions of vehicle acceleration and attitude is prevented by means of a ratchet wheel 64 which is fixed to spool 56 and a pawl 66 which is movable to engage the teeth of ratchet wheel 64 and thus prevent rotation of spool 56 in the direction to extend or unwind belt 30 from spool 56.

Movement of pawl 66 into engagement with the teeth of ratchet wheel 64 is caused by a pendulum type inertial member 68 which is suspended through an opening in a support 70 which extends between brackets 58 and 60. Inertial member 68 includes a top which serves as a cam 72 and engages a cam follower 74 whch is integral with pawl 66. Whenever inertial member 68 is caused to move away from the vertical disposition, as shown in FIG. 1, the action of cam 72 on cam follower 74 causes pawl 66 to engage the teeth of ratchet wheel 64.

Retraction mechanism 20 includes a tension eliminating mechanism 76 which includes a pawl 78 and a subassembly 80.

Subassembly 80, as can best be seen in FIGS. 6, 7 and 8, includes a ratchet wheel 82 and extending laterally from it an integral hollow shaft 84 made up of three segments 84a, 84b, and 84c. Located inside shaft 84 is a flat 85 which cooperates with flat 55 on shaft 54 to provide for conjoint rotation of ratchet wheel 82 with shaft 54.

Journaled for rotation on shaft 84 and disposed adjacent ratchet wheel 82 is a ringlike member 86 which serves to block engagement of pawl 76 with the teeth of ratchet wheel 82 under certain operating conditions. Member 86 includes a cutout portion 88 and an axially extending projection 90.

Disposed adjacent member 86 and rotatably journaled on shaft 84 is a ringlike member 92 which serves to block engagement of pawl 78 with the teeth of ratchet wheel 82 under certain operating conditions. Extending radially outwardly from member 92 is a projection 94 which includes a blocking surface 96. The projection 94 is engaged by the axially extending projection 90 of member 86 limiting the rotation of member 86 relative to member 92 to approximately one full revolution.

Also carried by shaft 84 adjacent to and outwardly of member 92 is an anti-rattle member or wire 98 which has a coiled portion 100 that loosely encircles shaft 84 so that rotation of shaft 54 in the belt retracting direction brings member 98 into engagement with pawl 66 to prevent it from rattling, as shown in FIG. 3. Rotation of shaft 54 in the other direction swings member 98 away from engagement with pawl 66. The engagement of coiled portion 100 with shaft 84 is such that member 98 tends to rotate with shaft 54, but permits rotation of shaft 54 relative to member 98 when member 98 is blocked from movement.

Finally, a retaining ring 102 is carried by shaft 84 outwardly of the arrangement of members 86, 92 and 98 on shaft 84. Retainer ring 102 is adapted to be engaged by a pair of lugs 104 resiliently connected to ratchet wheel 82 so that when lugs 104 engage retainer ring 102 ratchet wheel 82 and members 86, 92 and 98 are held together as a unitary subassembly. Integral with ring 102 is a plurality of resilient elements or legs 103 which function as springs to bias ratchet wheel 82 and members 86 and 92 into frictional engagement with each other.

At this point, it should be noted that subassembly 80 is held on shaft 54 by means of a lug 105 (best seen in FIG. 8) which is resiliently connected to ratchet wheel 82 and engages groove 57 on shaft 54.

Pawl 78 is journaled for rotation on a stub shaft 114 which extends from an upwardly extending portion 116 that is integral with support 70. A spring 118 serves to bias pawl 78 toward engagement with the teeth of ratchet wheel 82. Extending from pawl 78 is an arm 106 which ends in a projection 108 that extends from arm 106 at an angle thereto as can best be seen in FIG. 7. Also extending from arm 106 adjacent pawl 78 is a projection 110. The radially extending projection 94 of member 92 is disposed between the pawl 78 and the projection 110. With the rotation of member 92, the radially extending projection 94 will engage either the pawl 78 or the projection 110 limiting the rotation of member 92 relative to the pawl 78 as shown on FIGS. 3 and 4.

OPERATION

Turning now to the operation of my invention, it will be assumed that the safety belt system is not in use and that an occupant occupies the seat and connects the buckle tongue to the buckle latch. As the seat occupant pulls the buckle tongue across his body to connect it to the latch, lap belt 28 extends from spool 34 so that the diameter of the belt 28 wound on spool 34 decreases and provides a clearance between the portion of belt 28 remaining on spool 34 and the end of projection 108. As a result, the movement of pawl 78 toward engagement with the teeth of ratchet wheel 82 due to the bias of spring 118 no longer is prevented by the engagement of projection 108 with the surface of belt 28 wound on spool 34.

Since both lap belt 28 and shoulder belt 30 are connected to the buckle tongue, belt 30 will be extending at the same time that 28 is extending due to the movement of the buckle tongue by the seat occupant.

When shoulder belt 30 is fully retracted prior to extension of the belt, the tension eliminating device is in the condition shown in FIG. 3 with pawl 78 being held out of engagement with the teeth of ratchet wheel 82 due to the blocking action of blocking surface 96 of projection 94 which is carried by member 92.

As shoulder belt 30 is extended, the tension eliminating subassembly 80 rotates so that members 86 and 92 take the positions shown in FIG. 4. In this condition pawl 78 is being held away from engagement with the teeth of spocket wheel 82 by contact with the outer perimeter of member 86.

When shoulder belt 30 is fully extended the occupant of the seat then inserts the buckle tongue into the latch and in doing so permits belt 32 to retract approximately one full rotation of spool 56 so that blocking members 86 and 92 are momentarily again in the position shown in FIG. 3. Thereafter any slight movement of the occupant against belt 30 causes shaft 56 to rotate slightly clockwise, as viewed in FIG. 5, so that surface 96 is moved out of blocking engagement with pawl 78 with the result that pawl 78 pivots slightly clockwise due to the bias of spring 118 into engagement with the teeth of ratchet wheel 82. The mechanism then is in the condition shown in FIG. 5 so that belt 30 is slack, there being no tension on it from the rewind spring connected to spool 56 since the engagement of pawl 78 with ratchet wheel 82 prevents rotation of spool 56 in the direction to rewind belt 30.

It should be noted that blocking members 86 and 92 tend to rotate along with ratchet wheel 82 and spool 56 due to the frictional drag between each othe and with ratchet wheel 82 due to the bias of spring legs 103.

It will be noted that when the seat belt system is in the fully retracted condition shown in FIG. 3, or is in the condition where the seat belt system is in use, as shown in FIG. 5, the anti-rattle member 98 is rotated into engagement with pawl 66 and imposes a slight downward bias on pawl 66 to keep it from moving or rattling due to shocks transmitted to it from the vehicle during operation. On the other hand, slight extension movement of shoulder belt 30, as shown in FIG. 4, causes the anti-rattle member 98 to move away from engagement with pawl 66 so that it is now free to move into engagement with the ratchet wheel 64 in the event of an emergency condition due to a severe change in vehicle acceleration, for example.

When an occupant of the vehicle wishes to release the safety belt system he releases the buckle latch which then permits the rewind spring associated with lap belt 28 to retract belt 28 onto spool 34. Initially, shoulder belt 30 will not retract because tension eliminating mechanism 76 is blocking any bias of the rewind spring associated with belt 30. However, after belt 28 is partially retracted the amount of belt 28 wound on spool 34 increases sufficiently so as to contact arm 108 and cause it to move in a direction to disengage pawl 78 from ratchet wheel 82. Disengagement of pawl 78 from ratchet wheel 82 then permits the rewind spring associated with shoulder belt 30 to retract belt 30 onto spool 56 with the result that both belts 28 and 30 are returned to their stored positions on their respective spools.

MODIFICATIONS

A modified subassembly 119 which forms a portion of tension eliminating mechanism 76 is shown in FIGS. 9 and 10. The modification involves eliminating spring elements 103 and replacing the retaining ring 102 with a retaining ring 120 which does not carry spring elements and substituting for spring elements 103 a helical spring portion 122 on anti-rattle member 124. Spring portion 122 serves the dual function of encircling shaft 54 to carry anti-rattle member 124 on the shaft in the same manner as coiled portion 100 and also serves, in conjunction with retaining ring 120, as a spring to bias blocking members 86 and 92 into frictional engagement with each other and with ratchet wheel 82.

A further modification is shown in FIG. 11. In this modification the projection 94 of member 92 is combined with the retaining ring and spring assembly of the preferred embodiment to provide a member 126 which includes a retaining ring portion 128, a plurality of spring elements 130 and a projection 132 which serves the same function as projection 94. This permits the elimination of member 92 altogether since member 126 performs three separate functions, namely, retaining the other parts of subassembly 80 on shaft 84, providing spring bias to hold the parts in frictional engagement with each other and a projection 132 which serves to block engagement of pawl 78 with ratchet wheel 82 under certain operating conditions.

While three embodiments of my invention have been described, it will be understood that various other modifications can be made without departing from the spirit and scope of my invention. Therefore, the limits of my invention should be determined from the appended claims.

What is claimed is:

1. In a safety belt retraction mechanism having a rotatable shaft, a belt connected to and wound around the shaft, a spring connected to the shaft and biasing the shaft to rotate in the direction to wind the belt onto the shaft, a main ratchet wheel and a main pawl movable into engagement with the main ratchet wheel to prevent rotation of the shaft in a direction to extend the belt, a belt tension eliminating mechanism comprising:

a ratchet wheel mounted on the shaft for conjoint rotation therewith, said ratchet wheel including a hollow shaft;

a pawl member have a pawl movable into engagement with said ratchet wheel to prevent the rotation of the shaft in a direction to wind the belt onto the shaft and an integral stop projection spatially separated from said pawl;

a first member rotatably journaled on said hollow shaft and disposed adjacent to said ratchet wheel, said first member having a peripheral cam surface about a predetermined portion of the circumference for blocking the engagement of said pawl with said ratchet wheel and a first projection adjacent to the periphery extending axially away from said ratchet wheel;

a second member rotatably journaled on said hollow shaft and disposed adjacent to said first member, said second member having a second projection extending radially from its periphery between said pawl and said stop projection to limit the rotation of said second member, said second projection having a blocking surface on the side adjacent to said pawl for blocking the engagement of said pawl with said ratchet wheel when said second projection is engaging said pawl, said second projection further being engaged by said first projection limiting the rotation of said first member with respect to said second member to approximate one full revolution;

a compression spring carried on said hollow shaft for biasing said first and second members and said ratchet wheel in frictional engagement;

means for retaining said first and second members and said compression spring on said hollow shaft; and means for locking said ratchet wheel on the shaft.

2. A belt tension eliminating mechanism as set forth in claim 1 wherein said retaining means includes a ring and at least one lug provided at the end of said cylindrical shaft which is resiliently engageable with said ring.

3. A belt tension eliminating mechanism as set forth in claim 2 wherein said compression spring is integral with said ring.

4. A belt tension eliminating mechanism as set forth in claim 3 wherein said second member is integral with said retaining means.

5. A belt tension eliminating mechansim as set forth in claim 1 and including means for preventing rattling of the main pawl.

6. A belt tension eliminating mechanism as set forth in claim 5 wherein said rattling preventing means is an extension of aid compression spring and engages the main pawl when the shaft is rotated in a direction to wind the belt onto the shaft.

7. In a safety belt retractor mechanism having a rotatable shaft, a belt connected to and wound around the shaft, a retraction spring connected to the shaft and biasing the shaft to rotate in the direction to retract the belt, a ratchet wheel fixed to the shaft and a pawl movable into engagement with the ratchet wheel to prevent rotation of the shaft in the direction to extend the belt, the improvement comprising an anti-rattle member frictionally carried by the shaft and movable therewith, said anti-rattle member having a resilient portion radially extending therefrom and movable with said anti-rattle member into engagement with the pawl, said resilient radially extending portion producing a resilient force on the pawl to prevent rattling of the pawl when the shaft is rotated in the direction to retract the belt, and movable out of engagement with the pawl when the shaft is rotated in a direction to extend the belt.

8. The improvement set forth in claim 7 wherein said anti-rattle member is a resilient length of wire having a coiled portion through which the shaft passes and said radially extending portion, said coiled portion frictionally engaging the shaft sufficiently so that said anti-rattle member tends to rotate with the shaft, but loosely enough so that the shaft can rotate relative to said anti-rattle member when rotation of said anti-rattle member is prevented due to the resilient engagement of said radially extending portion with the pawl.

9. In a safety belt system having separate lap and shoulder belts attached to a double spool retraction mechanism having a separate spool for each of said lap and shoulder belts, each spool of said double spool retraction mechanism having a rotable spool shaft, one of said lap and shoulder belts connected to and wound around one of said spool shafts and the other of said lap and shoulder belts connected to and wound around the other of said spool shafts, each spool further having a spring connected to its associated spool shaft and biasing the associated spool shaft to rotate in the direction to wind the associated belt onto the spool shaft, a main ratchet wheel and a main movable pawl movable into engagement with the main ratchet wheel to prevent rotation of the associated spool shaft in a direction to extend the associated belt, a shoulder belt tension eliminating mechanism for the spool associated with the shoulder belt comprising:

a ratchet wheel mounted on the spool shaft for conjoint rotation therewith, said ratchet wheel including a hollow shaft circumscribing one end of said spool shaft;

a pawl member having a pawl movable into engagement with said ratchet wheel to prevent the rotation of said spool shaft in a direction to wind the shoulder belt onto the spool shaft and an integral stop projection spatially separated from said pawl;

a first member rotatably journaled on said hollow shaft and disposed adjacent said ratchet wheel, said first member having a peripheral cam surface about a predetermined portion of its circumference for blocking the engagement of said pawl with said ratchet wheel and a first projection adjacent to its periphery extending axially away from said ratchet wheel;

a second member rotatably journaled on said hollow shaft and disposed adjacent to the first member, said second member having a second projection extending radially from its periphery between said pawl and said stop projection to limit the rotation of said second member, said second projection having a blocking surface on the side adjacent to said pawl for blocking the engagement of said pawl with said ratchet wheel when said second projection is engaging said pawl, said second projection further being engaged by said first projection limiting the rotation of said first member with respect to said second member to approximately one full revolution;

a compression spring carried on said hollow shaft, said compression spring disposed to bias said first and second members and said ratchet wheel is frictional engagement; and means attached to said pawl and engaging the lap belt wound on its associated shaft for disengaging said pawl from said ratchet wheel in response to a predetermined number of turns of the lap belt being wound on its associated shaft.

* * * * *